US009366206B2

(12) United States Patent
Myers et al.

(10) Patent No.: US 9,366,206 B2
(45) Date of Patent: Jun. 14, 2016

(54) FUEL-AIR SEPARATOR AND PULSE DAMPENER

(71) Applicant: Ford Global Technologies, LLC, Dearborn, MI (US)

(72) Inventors: Eric Myers, Howell, MI (US); Yi Zhang, Ann Arbor, MI (US); Syed K. Ali, Dearborn, MI (US); Mike Dong, Ann Arbor, MI (US); Carlos Armesto, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 756 days.

(21) Appl. No.: 13/717,402

(22) Filed: Dec. 17, 2012

(65) Prior Publication Data

US 2014/0165971 A1 Jun. 19, 2014

(51) Int. Cl.
*B01D 19/00* (2006.01)
*F02M 37/20* (2006.01)
*B01D 45/12* (2006.01)
*B01D 21/26* (2006.01)
*B04C 3/06* (2006.01)
*B01D 17/02* (2006.01)
*F02M 37/00* (2006.01)

(52) U.S. Cl.
CPC .............. *F02M 37/20* (2013.01); *B01D 45/12* (2013.01); *B01D 17/0217* (2013.01); *B01D 19/0042* (2013.01); *B01D 19/0057* (2013.01); *B01D 21/267* (2013.01); *B04C 3/06* (2013.01); *F02M 37/0041* (2013.01)

(58) Field of Classification Search
CPC ........... B01D 19/0057; B01D 17/0217; B01D 45/16; B01D 19/0042; B01D 45/12; B01D 17/00; B01D 21/267; B04C 3/06; B04C 5/103; B04C 5/13; B04C 3/00; B04C 5/04; F02M 37/20; F02M 37/0041
USPC .................... 123/516–520; 96/208, 209, 216; 95/261; 55/459.1
See application file for complete search history.

(56) References Cited

U.S. PATENT DOCUMENTS

| 4,281,626 | A | | 8/1981 | Fishe |
| 4,628,881 | A | | 12/1986 | Beck et al. |
| 4,707,165 | A | * | 11/1987 | Tauber ............... B01D 19/0057 210/108 |
| RE33,270 | E | | 7/1990 | Beck et al. |
| 5,097,803 | A | | 3/1992 | Galvin |
| 5,115,784 | A | | 5/1992 | Mito et al. |
| 5,241,935 | A | | 9/1993 | Beck et al. |
| 5,758,610 | A | | 6/1998 | Park |
| 5,855,197 | A | | 1/1999 | Kato |
| 5,896,846 | A | | 4/1999 | Bauer et al. |

(Continued)

OTHER PUBLICATIONS

Armesto, Carlos et al., "Diesel Fuel System Conditioning," U.S. Appl. No. 13/409,000, filed Feb. 29, 2012, 21 pages.

*Primary Examiner* — Joseph Dallo
(74) *Attorney, Agent, or Firm* — Julia Voutyras; Alleman Hall McCoy Russell & Tuttle LLP (57) ABSTRACT

A fuel-air separator includes a chamber with an interior side-wall surface and adjacent interior top and bottom surfaces. An inlet of the fuel-air separator opens to the interior side-wall surface to admit fuel and air and to cause the fuel and air to flow helically down and along the interior side-wall surface. A diptube opens to the bottom surface and extends along an axis of the interior side-wall surface to a fuel outlet, while the separated air is released to the atmosphere.

20 Claims, 6 Drawing Sheets

(56) References Cited

U.S. PATENT DOCUMENTS

| | | | | |
|---|---|---|---|---|
| 6,290,760 B1* | 9/2001 | Taivalkoski | B01D 19/0057 | 222/72 |
| 6,398,973 B1* | 6/2002 | Saunders | A47L 9/1625 | 209/710 |
| 6,485,854 B1* | 11/2002 | Grover | H01M 8/04291 | 429/411 |
| 6,576,029 B2* | 6/2003 | West | B01D 45/14 | 55/349 |
| 6,622,709 B2* | 9/2003 | Miller | B01D 36/001 | 123/510 |
| 6,748,872 B2 | 6/2004 | Parrish | | |
| 6,752,860 B1* | 6/2004 | Hoydal | B01D 17/0208 | 166/105.5 |
| 6,776,823 B2* | 8/2004 | Hotta | B01D 45/14 | 55/459.1 |
| 6,896,819 B2* | 5/2005 | Morse | B01D 19/0005 | 210/188 |
| 6,976,713 B2* | 12/2005 | Kish | B61C 15/107 | 222/72 |
| 7,001,448 B1* | 2/2006 | West | B01D 45/16 | 55/413 |
| 7,013,878 B1* | 3/2006 | Cotton | F02M 37/20 | 123/41.31 |
| 7,713,335 B2* | 5/2010 | Ringenberger | B67D 7/763 | 123/516 |
| 7,870,848 B2* | 1/2011 | Elwart | F02M 33/02 | 123/518 |
| 7,905,946 B1* | 3/2011 | Weislogel | B01D 45/06 | 55/428 |
| 7,931,011 B2* | 4/2011 | Lee | F02M 37/0023 | 123/514 |
| 8,273,164 B2* | 9/2012 | Makino | B01D 53/0415 | 123/519 |
| 8,273,165 B2* | 9/2012 | Rock | B01D 1/14 | 210/180 |
| 2001/0005986 A1* | 7/2001 | Matsubara | B01D 45/12 | 55/459.1 |
| 2003/0084869 A1 | 5/2003 | Parrish | | |
| 2003/0121416 A1* | 7/2003 | Morse | B01D 19/0005 | 95/261 |
| 2007/0209334 A1* | 9/2007 | Conrad | A47L 5/28 | 55/337 |
| 2008/0029071 A1* | 2/2008 | Saito | B01D 19/0052 | 123/518 |
| 2009/0194076 A1* | 8/2009 | Elwart | F02M 33/02 | 123/519 |
| 2009/0277251 A1* | 11/2009 | Takakura | F02M 25/0809 | 73/40.7 |
| 2009/0314261 A1* | 12/2009 | Hasebe | F02M 35/04 | 123/520 |
| 2010/0051369 A1* | 3/2010 | Kuramochi | B62J 35/00 | 180/69.4 |
| 2011/0056379 A1* | 3/2011 | Lucas | B01D 45/12 | 96/216 |
| 2011/0067568 A1* | 3/2011 | Triglavcanin | B01D 19/0057 | 95/261 |
| 2012/0012080 A1* | 1/2012 | Dong | B01D 46/2411 | 123/198 E |

* cited by examiner

FUEL-AIR SEPARATOR AND PULSE DAMPENER

TECHNICAL FIELD

This application relates to the field of motor vehicle engineering, and more particularly, to separating air from fuel in a motor-vehicle fuel system.

BACKGROUND AND SUMMARY

In a motor-vehicle fuel system with high-pressure fuel injection, air entrained in the fuel can have various undesirable effects. Such effects include engine hesitation and stalling, difficulty starting, and damage to the fuel-injection system. In the current state-of-the-art, entrained air may be separated from the fuel in fuel-pump and pressure-regulator componentry, and most commonly in the fuel-filter housing. The separated air may be admitted to a fuel-return line of the fuel-injection system, which takes it back to the fuel tank where it is vented to the atmosphere.

The solution summarized above admits of several disadvantages. First, air present in the fuel-filter housing may limit the effective filtration area of the fuel filter, causing inadequate pressurization downstream of the fuel filter at relatively high flow rates. Second, in a modern motor-vehicle system, various components (e.g., heating components) may divert fuel from the fuel-return line back to the engine-supply line. If the fuel-return line carries air that was separated from the fuel, this air will be re-introduced back into the engine-supply line. Third, the componentry used to separate entrained air from the fuel typically does little to dampen the pressure pulsations from the reciprocating fuel pumps of the fuel system. Therefore, additional componentry may be required to deliver a steady flow of fuel to the engine.

Accordingly, one embodiment of this disclosure provides a fuel-air separator having a chamber with an interior side-wall surface and adjacent interior top and bottom surfaces. An inlet of the fuel-air separator opens to the interior side-wall surface to admit fuel and air and to cause the fuel and air to flow helically down and along the interior side-wall surface. A diptube opens to the bottom surface and extends along an axis of the interior side-wall surface to a fuel outlet. An air outlet is included at the top surface of the chamber to release the separated air to the atmosphere. With the disclosed separator installed in a motor-vehicle fuel system, entrained air is effectively separated from the fuel, and in a manner that does not limit the effective filtration area of the fuel filter or re-introduce air into the engine-supply line. In addition, the disclosed fuel-air separator provides effective dampening of pressure pulses caused by reciprocating fuel pumps, enabling a steadier delivery of fuel to the engine.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
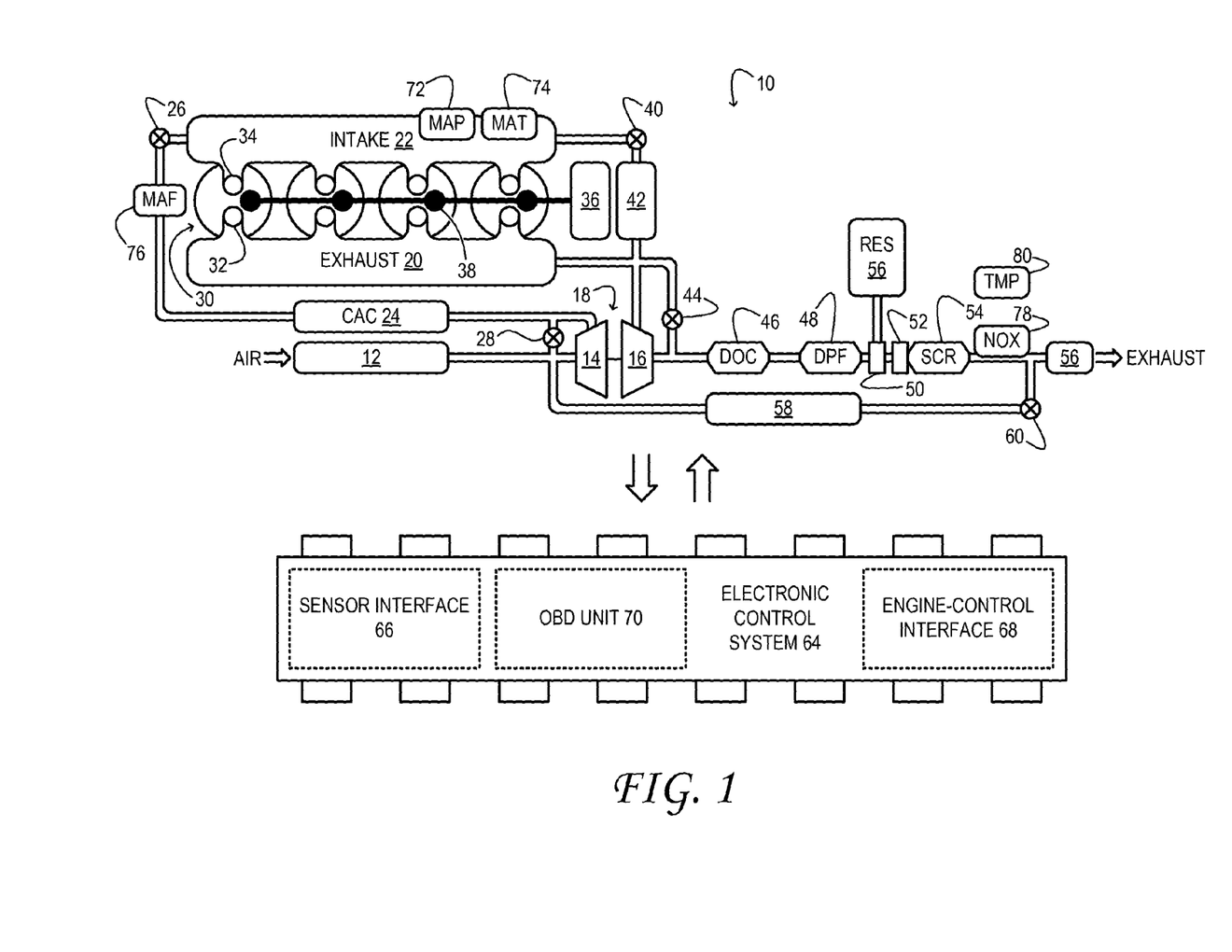
FIG. 1 schematically shows aspects of an example engine system in accordance with an embodiment of this disclosure.

FIG. 1 schematically shows aspects of an example engine system 10 of a motor vehicle. In engine system 10, fresh air is inducted into air cleaner 12 and flows to compressor 14. The compressor may be any suitable intake-air compressor—a motor-driven or driveshaft driven supercharger compressor, for example. In engine system 10, however, the compressor is mechanically coupled to turbine 16 in turbocharger 18, the turbine driven by expanding engine exhaust from exhaust manifold 20. In one embodiment, the compressor and turbine may be coupled within a twin scroll turbocharger. In another embodiment, the turbocharger may be a variable geometry turbocharger (VGT), in which turbine geometry is actively varied as a function of engine speed.

Compressor 14 is coupled fluidically to intake manifold 22 via charge-air cooler (CAC) 24 and throttle valve 26. Pressurized air from the compressor flows through the CAC and the throttle valve en route to the intake manifold. In the illustrated embodiment, compressor by-pass valve 28 is coupled between the inlet and the outlet of the compressor. The compressor by-pass valve may be a normally closed valve configured to open to relieve excess boost pressure under selected operating conditions.

Exhaust manifold 20 and intake manifold 22 are coupled to a series of cylinders 30 through a series of exhaust valves 32 and intake valves 34, respectively. In one embodiment, the exhaust and/or intake valves may be electronically actuated. In another embodiment, the exhaust and/or intake valves may be cam actuated. Whether electronically actuated or cam actuated, the timing of exhaust and intake valve opening and closure may be adjusted as needed for desired combustion and emissions-control performance.

Cylinders 30 may be supplied any of a variety of fuels, depending on the embodiment: diesel, biodiesel, or mixtures thereof. In the illustrated embodiment, fuel from fuel system 36 is supplied to the cylinders via direct injection through fuel injectors 38. In the various embodiments considered herein, the fuel may be supplied via direct injection, multi-point injection, port injection, or any combination thereof. In engine system 10, combustion may be initiated via compression ignition in any variant. In other embodiments, the supplied fuel may include gasoline, alcohols, or mixtures thereof, and combustion may be initiated via spark ignition.

Engine system 10 includes high-pressure (HP) exhaust-gas recirculation (EGR) valve 40 and HP EGR cooler 42. When the HP EGR valve is opened, some high-pressure exhaust from exhaust manifold 20 is drawn through the HP EGR cooler to intake manifold 22. In the intake manifold, the high pressure exhaust dilutes the intake-air charge for cooler combustion temperatures, decreased emissions, and other benefits. The remaining exhaust flows to turbine 16 to drive the turbine. When reduced turbine torque is desired, some or all of the exhaust may be directed instead through wastegate 44, by-passing the turbine. The combined flow from the turbine and the wastegate then flows through the various exhaust-aftertreatment devices of the engine system, as further described below.

In engine system 10, diesel-oxidation catalyst (DOC) 46 is coupled downstream of turbine 16. The DOC is configured to oxidize residual CO, hydrogen, and hydrocarbons present in the engine exhaust. Diesel particulate filter (DPF) 48 is coupled downstream of DOC 46, and reductant injector 50, reductant mixer 52, and SCR stage 54 are coupled downstream of DPF 48. It will be noted that the nature, number, and arrangement of exhaust-aftertreatment stages in the engine system may differ for the different embodiments of this disclosure. For instance, some configurations may include an additional soot filter or a multi-purpose exhaust-aftertreatment stage that combines soot filtering with other emissions-control functions, such as NO trapping.

Continuing in FIG. 1, all or part of the treated exhaust may be released into the ambient via silencer 56. Depending on operating conditions, however, some treated exhaust may be diverted through low-pressure (LP) EGR cooler 58. The exhaust may be diverted by opening LP EGR valve 60 coupled in series with the LP EGR cooler. From LP EGR cooler 58, the cooled exhaust gas flows to compressor 14. By partially closing exhaust-backpressure valve 62, the flow potential for LP EGR may be increased during selected operating conditions. Other configurations may include a throttle valve upstream of air cleaner 12 instead of the exhaust backpressure valve.

Engine system 10 includes an electronic control system (ECS) 64 configured to control various engine-system functions. ECS 64 includes sensor interface 66, engine-control interface 68, and on-board diagnostic (OBD) unit 70. To assess operating conditions of engine system 10 and of the vehicle in which the engine system is installed, sensor interface 66 receives input from various sensors arranged in the vehicle—flow sensors, temperature sensors, pedal-position sensors, fuel-pressure sensors, etc. Some example sensors are shown in FIG. 1—manifold air-pressure (MAP) sensor 72, manifold air-temperature sensor (MAT) 74, mass air-flow (MAF) sensor 76, $NO_x$ sensor 78, and exhaust-system temperature sensor 80. Various other sensors may be provided as well. Engine-control interface 68 is configured to actuate electronically controllable valves, actuators, and other componentry of the vehicle—compressor by-pass valve 28, wastegate 44, and EGR valves 40 and 60, for example.

Figure 2:
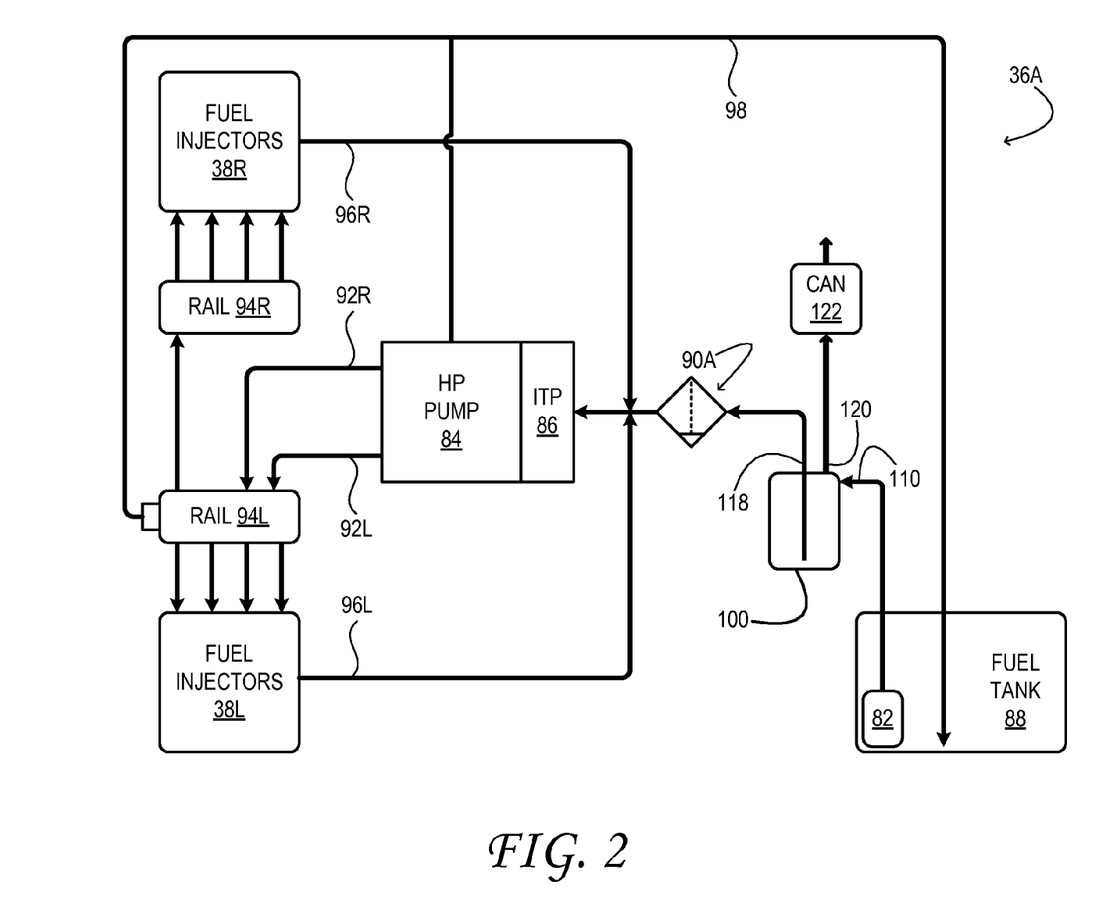
FIG. 2 shows aspects of an example fuel system in accordance with an embodiment of this disclosure.

FIG. 2 shows aspects of an example fuel system 36A, which includes a lift pump 82 and a high-pressure (HP) fuel-injection pump 84. In the illustrated embodiment, an internal transfer pump (ITP) 86 is coupled to the inlet of the HP pump. The lift pump and ITP draw diesel fuel from fuel tank 88 to the HP pump, suctioning the fuel through fuel filter 90A. In the embodiment of FIG. 2, the HP pump includes a left-side outlet 92L and a right-side outlet 92R. Here, pressurized fuel from both the left- and right-side outlets flows to left-side fuel rail 94L, which supplies fuel to left-side fuel injectors 38L. From the left side fuel rail, the pressurized fuel also flows to right-side fuel rail 94R, which supplies fuel to right-side fuel injectors 38R. In this manner, the fuel system is fluidically coupled to the engine. Return lines 96L and 96R conduct non-injected fuel from the fuel injectors back to the ITP. A return line 98 is also provided from the left-side fuel rail. This line conducts non-injected fuel from the fuel rails, along with cooling and lubricating effluent from the HP pump, back to fuel tank 88.

No aspect of the foregoing description or drawings should be interpreted in a limiting sense, for numerous variants and combinations are contemplated as well. For example, return line 98 may be omitted in some embodiments. In addition, any or all of the fuel filters 90 may include additional componentry, such as a water-in-fuel sensor, a water reservoir to temporarily store water removed from the fuel by the fuel filter, and a drain to permanently discharge the stored water. Furthermore, although the illustrated fuel-system componentry is compatible with the diesel engine system of FIG. 1, it also may be used in a gasoline direct injection (GDI) engine system.

In fuel systems as described herein, the presence of entrained air in the fuel lines may have undesirable effects, which include engine hesitation and stalling, difficulty starting, and damage to fuel pumps and fuel injectors. Accordingly, fuel system 36A includes a fuel-air separator 100 coupled between fuel tank 88 and fuel filter 90A. In other fuel-system configurations, the fuel-air separator may be coupled elsewhere.

Figure 3:
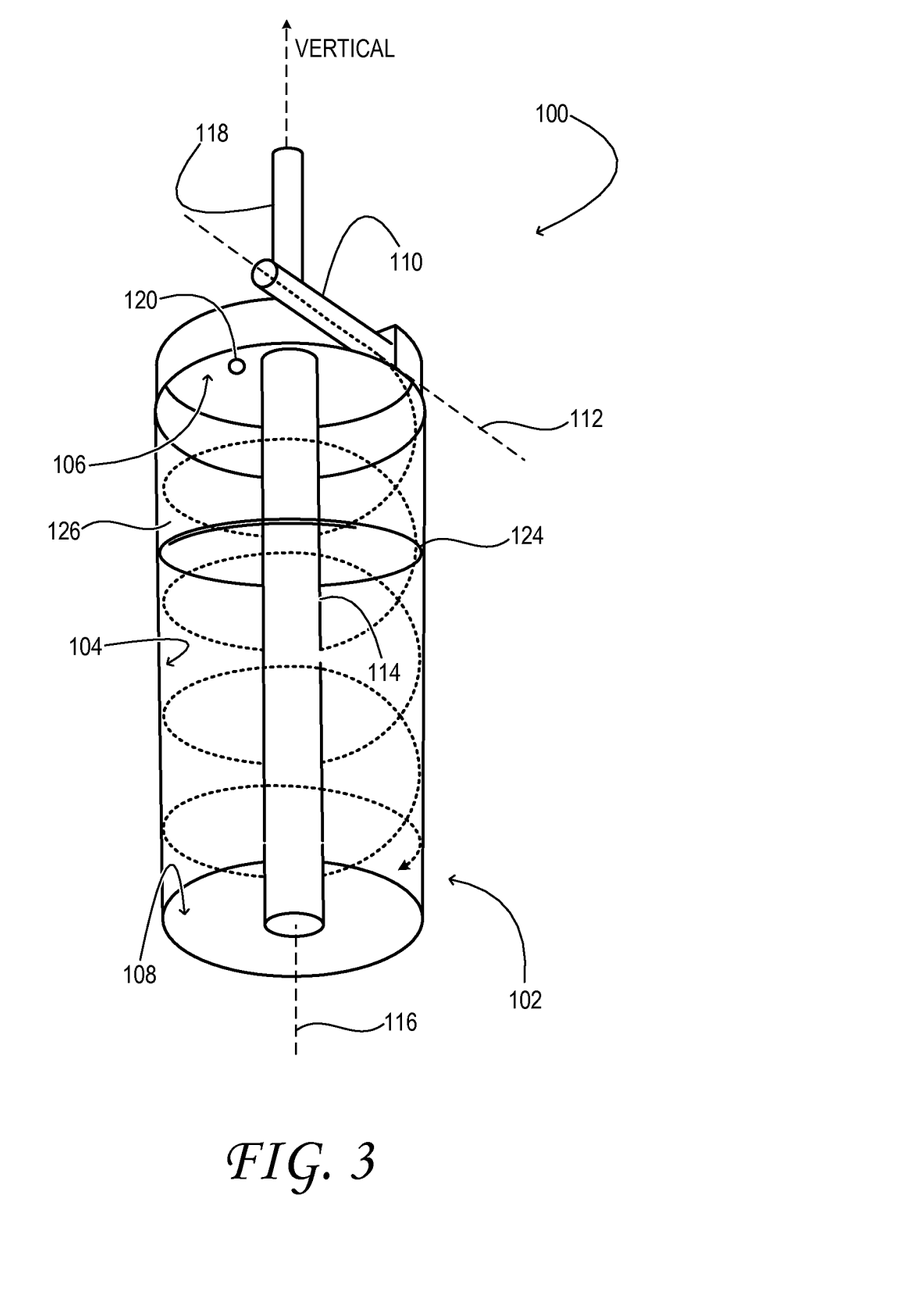
FIG. 3 shows aspects of an example fuel-air separator in accordance with an embodiment of this disclosure.

FIG. 3 shows aspects of fuel-air separator 100 in one embodiment. The fuel-air separator includes a chamber 102 with an interior side-wall surface 104. Adjacent to the interior side-wall surface are interior top surface 106, and interior bottom surface 108. An inlet 110 opens to the interior side-wall surface to admit fuel and air into the chamber. In the illustrated embodiment, the inlet is adjacent the interior top surface of the chamber. It is aligned to a tangent 112 of the interior side-wall surface, causing fuel and air admitted through the inlet to flow helically down and along the interior side-wall surface. A diptube 114 opens to the interior bottom surface and extends upward, along central axis 116 of the interior side-wall surface to fuel outlet 118. In the illustrated embodiment, air outlet 120 is positioned at the interior top surface of the chamber. In other embodiments, the air outlet may be located in the interior side-wall surface, adjacent the interior top surface.

Returning briefly to FIG. 2, inlet 110 of fuel-air separator 100 receives fuel (which may entrain air) from upstream components of fuel system 36—e.g., fuel tank 88 and lift pump 82. From fuel outlet 118, the fuel (with significantly less air entrained) is delivered to the downstream components of the fuel system—e.g., fuel pumps (84, 86), fuel filter 90A, and fuel injectors 38. Meanwhile, the air separated from the fuel is vented to the atmosphere, through air outlet 120. In the embodiment of FIG. 2, the air is vented through carbon canister 122 to decrease atmospheric hydrocarbon emissions. However, the carbon canister may be omitted in some embodiments, particularly when the fuel used in the fuel system is relatively non-volatile—e.g., diesel fuel. More generally, the separated air may be vented to any suitable pressure sink, including the fuel tank itself, which may be maintained near atmospheric pressure.

Continuing now in FIG. 3, diptube 114 is oriented vertically in the illustrated embodiment, with interior top surface 106 arranged directly above interior bottom surface 108. In other embodiments, the diptube may be at least somewhat oblique, and the top and bottom surfaces may be offset horizontally from each other. The interior side-wall surface of chamber 102 is cylindrical in the illustrated embodiment, but this feature is by no means necessary, for in other embodiments, the interior side-wall surface may be conical. In other words, the portion of the chamber delimited by the interior side-wall surface and the interior top and bottom surfaces may be a frustrum. Accordingly, the interior bottom surface may be larger in diameter than the interior top surface in some embodiments. This feature may cause the swirling fuel to decelerate during its passage to the interior bottom surface, reducing the turbulence that could whip additional air into the fuel. In other embodiments, the interior top surface may be larger in diameter than the interior bottom surface. This feature may allow the fuel to accelerate during passage to the interior bottom surface, providing prolonged centrifugal separation of air from the fuel.

During operation, fuel-air separator 100 continuously receives fuel from upstream components of the fuel system and continuously releases fuel to downstream components of the fuel system. A steady-state level 124 of fuel is thereby maintained in chamber 102, with diptube 114 extending below the steady-state level. As shown in FIG. 3, the reserve of fuel in the fuel-air separator may not completely fill the volume of the chamber. Accordingly, a short column 126 of air is maintained above the steady-state level of fuel in the chamber. This air is compressed when the pressure at the inlet increases and is rarefied when the pressure at the inlet decreases. This action helps to dampen pressure pulsations in the fuel, resulting in a steadier flow of fuel through the fuel system.

Other measures may be taken to enhance the pressure-pulse dampening effect of fuel-air separator 100, in addition to compression and rarefaction of air column 126. In some embodiments, specifically, the chamber may be resiliently deformable under the influence of a pressure pulsation of the fuel and air admitted to the inlet. For example, one or more of the interior bottom surface, the interior top surface, and the interior side-wall surface may be resiliently deformable. The resiliently deformable surfaces may be formed from any suitable material—spring steel or a hydrocarbon-resistant, resilient polymer material, for instance. In some embodiments, the surfaces indicated to be 'resiliently deformable' may deform to a greater extent under pressure pulsations from the fuel system the surfaces not indicated to be resiliently deformable, even though any or all of the fuel-air separator surfaces may deform to some extent.

By expanding outward in response to a positive pressure impulse and collapsing inward in response to a negative pressure pulse, the resiliently deformable surfaces of chamber 102 dynamically adjust the fuel-line volume to compensate for the positive and negative pressure pulses, resulting in a significantly dampening of the pressure pulsations. In some embodiments, the deformation of the resiliently deformable surfaces may be sufficient, when combined with the dampening effect of the air column within the chamber, to dampen pressure pulsations from the fuel system at least as much as a discrete pressure-pulse dampener, which is known in the art.

Figure 4:
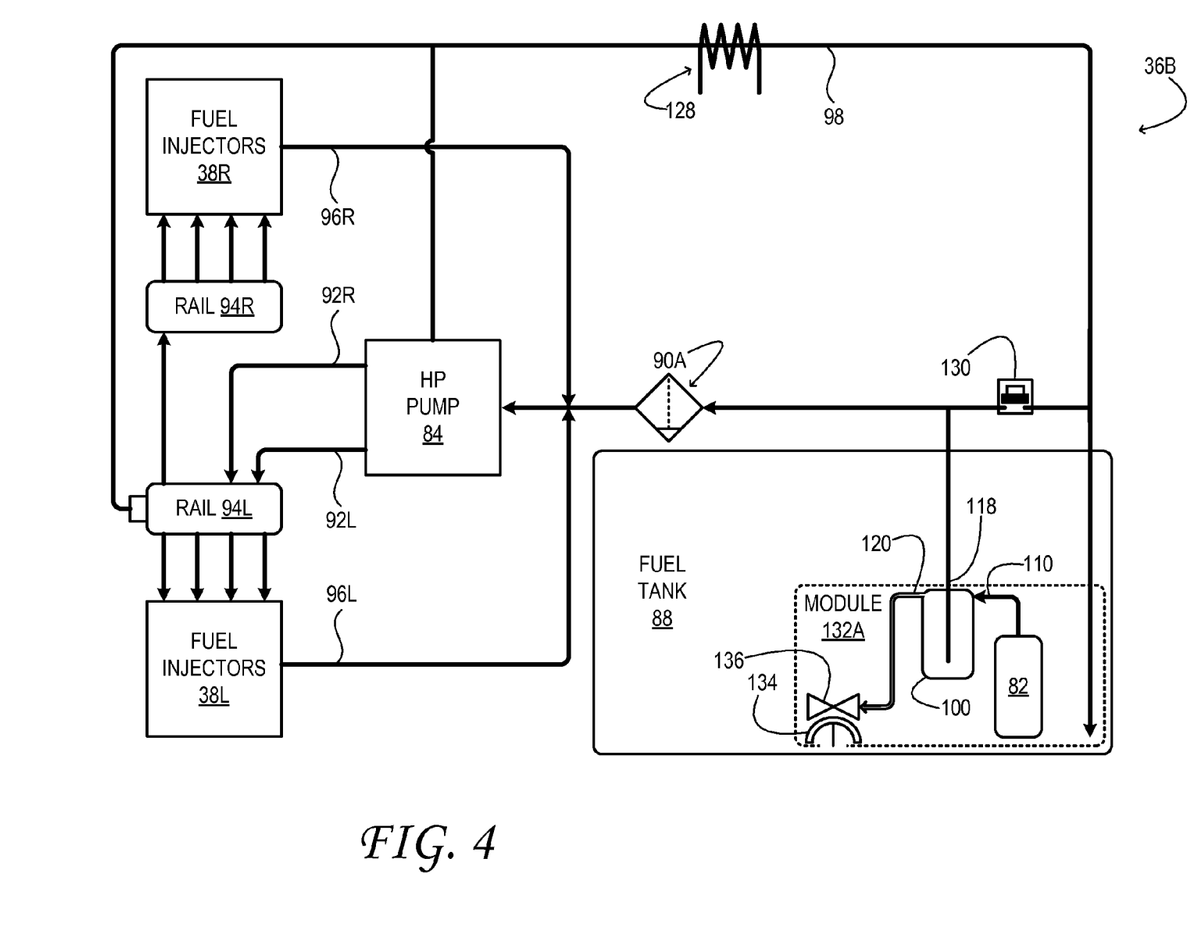
FIGS. 4 and 5 show aspects of additional fuel systems in accordance with embodiments of this disclosure.

FIG. 4 shows aspects of another example fuel system 36B in one embodiment. Fuel system 36B includes many of the features of fuel system 36A, but lacks an ITP. This fuel system includes a fuel cooler 128 to provide cooling of the fuel in return line 98, under selected conditions. The system also includes a bypass valve 130, which diverts the returning fuel to the inlet of fuel filter 90A under selected conditions—e.g., at low temperatures, where performance is improved by retaining as much heat as possible in the recirculating fuel.

In fuel system 36B, fuel-delivery module 132A is coupled within fuel tank 88. Fuel-air separator 100 is coupled within the fuel delivery module, with diptube 114 extending out through the wall of the fuel tank—e.g., coupled to an outlet line that exits the fuel tank. Fuel from the tank enters the interior of the fuel-delivery module through umbrella valve 134. When lift pump 82 is operating, the umbrella valve is biased in the open position via suction from jet pump 136. The jet pump draws fuel through the open umbrella valve to maintain a suitable level of fuel within the fuel-delivery module, irrespective of the level or slosh of the fuel outside the module. In the embodiment shown in FIG. 4, the jet pump is driven by overflow from fuel-air separator 100 (e.g., from air outlet 120). The configuration of FIG. 4 may be used with gasoline or diesel-engine systems, in environments where high-quality fuel is available.

Figure 5:
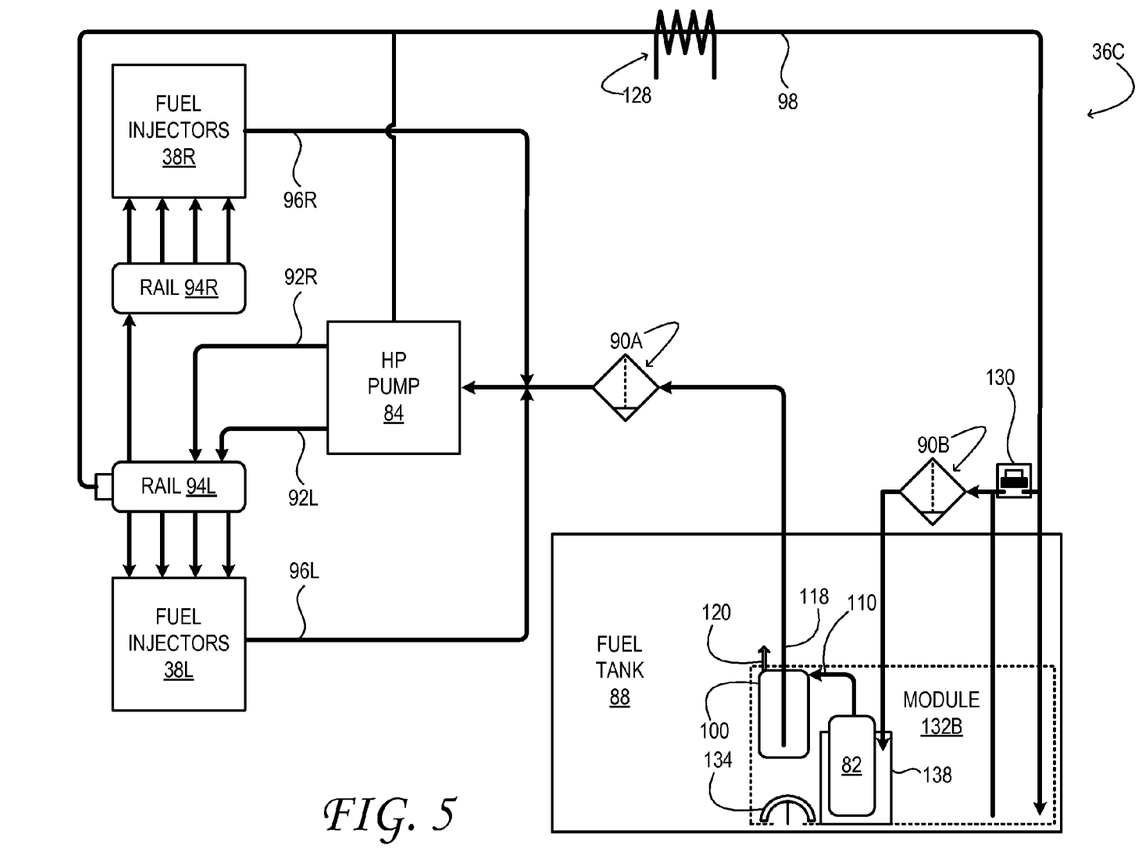

FIG. 5 shows aspects of another example fuel system 36C in one embodiment. Fuel system 36C includes many of the features of fuel system 36B, but lacks a jet pump. Instead, lift pump 82 provides suction that draws the fuel into chamber 138, in which the lift pump is mounted. The fuel is drawn into the chamber from secondary fuel filter 90B, which receives fuel from the interior of fuel-delivery module 132B. Fuel enters the fuel-delivery module through umbrella valve 134, as in the foregoing embodiment. The configuration of FIG. 5 may be most useful in environments where fuel quality is poor or inconsistent.

The configurations described above enable various methods for separating air from fuel in a motor-vehicle fuel system. Accordingly, some such methods are now described, by way of example, with continued reference to the above configurations. It will be understood, however, that the methods here described, and others within the scope of this disclosure, may be enabled by different configurations as well. The methods may be entered upon any time engine system 10 is operating, and may be executed repeatedly.

Figure 6:
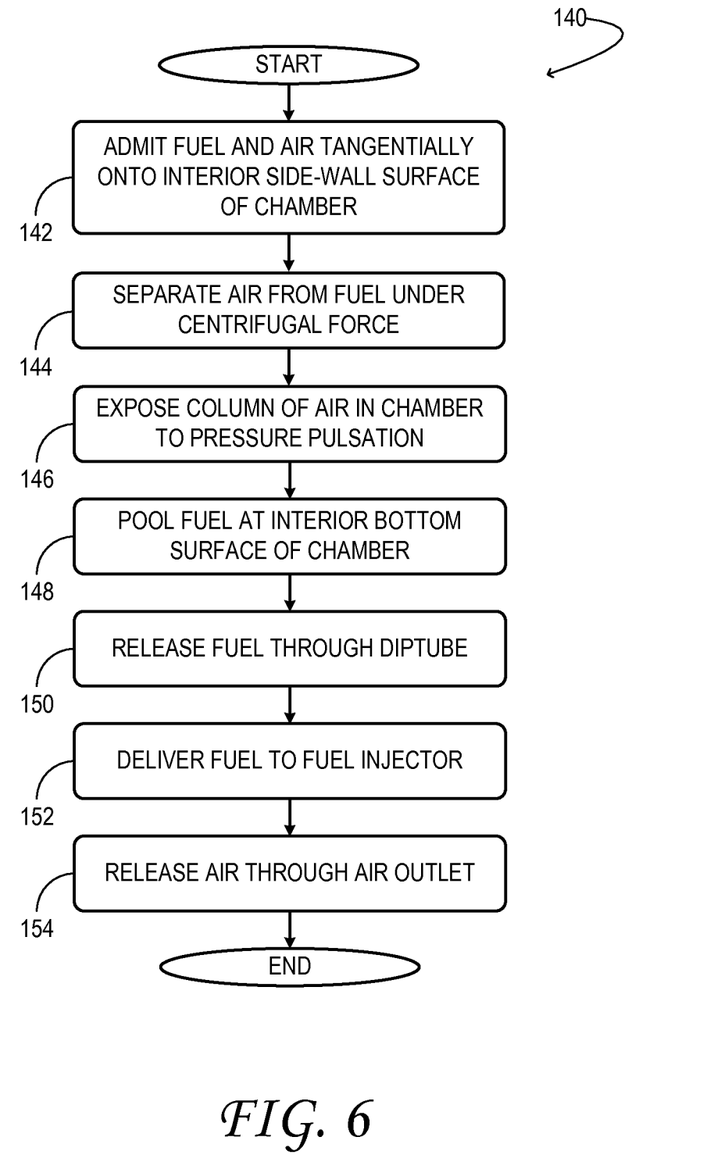
FIG. 6 illustrates an example method for separating air from fuel using a fuel-air separator in a motor-vehicle fuel system, in accordance with an embodiment of this disclosure.

FIG. 6 illustrates an example method 140 for separating air from fuel (e.g., diesel fuel or gasoline) in a fuel-air separator of a motor-vehicle fuel system. At 142 of method 140, fuel and air are admitted tangentially onto an interior side-wall surface of a chamber of the fuel-air separator. As described hereinabove, the fuel and air may be admitted from a pressurized fuel line of a motor-vehicle fuel system. At 144 the air is separated from the fuel under the centrifugal force caused by a helical flow of the fuel and air down and along the interior side-wall surface. At 146 a column of air inside the chamber is exposed to a pressure pulsation of the admitted fuel and air, which results in a dampening of the pressure pulsation. At 148 the fuel is pooled up at the interior bottom surface of the chamber. At 150 the fuel is released through a diptube opening to the interior bottom surface and extending parallel to an axis of the interior side-wall surface. At 152, the fuel released through the diptube is delivered to a fuel injector of the engine system. At 154 the air is released through an outlet at an interior top surface of the chamber. The air released may be vented to the atmosphere, rather than being returned to the engine system. In some embodiments, the air may be vented to the atmosphere via an adsorbent canister.

It will be understood that the articles, systems, and methods described hereinabove are non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A fuel-air separator comprising:
   a chamber with an interior side-wall surface and adjacent interior top and bottom surfaces;
   an inlet opening to the side-wall surface to admit fuel and air and to cause the fuel and air to flow helically down and along the side-wall surface;
   a diptube opening to the bottom surface and extending along an axis of the side-wall surface to a fuel outlet, wherein a distance between the side-wall surface and the diptube along the entire length of the diptube is unobstructed, wherein the diptube extends below a steady-state level of fuel and wherein the fuel outlet is at the top surface; and
   an air outlet at the top surface.

2. The fuel-air separator of claim 1 wherein the diptube is oriented vertically.

3. The fuel-air separator of claim 1 wherein the interior side-wall surface is cylindrical.

4. The fuel-air separator of claim 3 wherein the interior top surface is directly above the interior bottom surface.

5. The fuel-air separator of claim 1 wherein the inlet is adjacent the interior top surface.

6. The fuel-air separator of claim 1 wherein the inlet is aligned to a tangent of the interior side-wall surface.

7. The fuel-air separator of claim 1 wherein the interior top surface is larger in diameter than the interior bottom surface.

8. The fuel-air separator of claim 1 wherein the interior bottom surface is larger in diameter than the interior top surface.

9. The fuel-air separator of claim 1 wherein the chamber is resiliently deformable under the influence of a pressure pulsation of the fuel and air admitted to the inlet.

10. An engine system comprising:
a fuel-air separator having a chamber with an interior side-wall surface and adjacent interior top and bottom surfaces, an inlet opening to the side-wall surface to admit fuel and air and to cause the fuel and air to flow helically down and along the side-wall surface, a diptube opening to the bottom surface and extending along an axis of the side-wall surface to a fuel outlet at the top surface, the fuel outlet at the top surface delivering fuel with less entrained air than at the inlet, wherein a distance between the side-wall surface and the diptube along the entire length of the diptube is unobstructed, wherein the diptube extends below a steady-state level of fuel and an air outlet at the top surface; and
a fuel tank.

11. The engine system of claim 10 wherein the fuel-air separator is coupled in the fuel tank, with the diptube coupled to an outlet line that exits the fuel tank.

12. The engine system of claim 10 further comprising:
a fuel pump coupled to the inlet; and
a fuel injector coupled to the fuel outlet, the air outlet being vented to the atmosphere.

13. The engine system of claim 12 wherein the fuel injector is coupled to a combustion chamber of the engine system.

14. The engine system of claim 12 wherein the fuel injector is coupled to an intake manifold or cylinder port of the engine system.

15. A method to separate air from fuel in a fuel-air separator of a motor-vehicle fuel system, the method comprising:
admitting fuel and air tangentially onto an interior side-wall surface of a chamber of the fuel-air separator;
separating the air from the fuel under a centrifugal force caused by a helical flow of the fuel and air down and along the interior side-wall surface;
pooling the fuel at an interior bottom surface of the chamber;
releasing the fuel through a diptube opening to the interior bottom surface of the chamber and extending parallel to an axis of the interior side-wall surface to a fuel outlet at a top surface of the chamber, wherein a distance between the side-wall surface and the diptube along the entire length of the diptube is unobstructed, wherein the diptube extends below a steady-state level of fuel and
releasing the air through an outlet at an interior top surface of the chamber and fuel through the fuel outlet at the top surface.

16. The method of claim 15 further comprising exposing a column of air inside the chamber to a pressure pulsation of the admitted fuel and air to dampen the pressure pulsation.

17. The method of claim 15 wherein the fuel and air are admitted from a pressurized fuel line of a motor-vehicle engine system, the method further comprising delivering the fuel released through the diptube to a fuel injector of the fuel system.

18. The method of claim 17 wherein the air released is vented to the atmosphere, rather than being returned to the fuel system.

19. The method of claim 18 wherein the air is vented to the atmosphere via an adsorbent canister.

20. The method of claim 15 wherein the fuel is diesel fuel.

\* \* \* \* \*